(12) United States Patent
Turner, Jr.

(10) Patent No.: US 7,887,622 B1
(45) Date of Patent: Feb. 15, 2011

(54) SYSTEM, AND ASSOCIATED METHOD, FOR RECOVERING WATER FROM AIR

(76) Inventor: J. Glenn Turner, Jr., 3537 Colgate, Dallas, TX (US) 75225

( * ) Notice: Subject to any disclaimer, the term of this patent is extended or adjusted under 35 U.S.C. 154(b) by 202 days.

(21) Appl. No.: 12/355,982

(22) Filed: Jan. 19, 2009

Related U.S. Application Data

(63) Continuation-in-part of application No. 11/148,483, filed on Jun. 9, 2005, now Pat. No. 7,478,535.

(51) Int. Cl.
*B01D 53/00* (2006.01)
*F25D 21/00* (2006.01)
(52) U.S. Cl. .............................. 95/288; 62/3.2; 62/3.4
(58) Field of Classification Search .................. 95/288; 62/3.2, 3.4
See application file for complete search history.

(56) References Cited

U.S. PATENT DOCUMENTS 5,846,296 A * 12/1998 Krumsvik .................... 95/115
7,467,523 B2 * 12/2008 Vetrovec et al. ............... 62/272

* cited by examiner

*Primary Examiner*—Robert A Hopkins
(74) *Attorney, Agent, or Firm*—Scheef & Stone, LLP; Jack D. Stone, Jr.

(57) ABSTRACT

A system for condensing water from air includes a column having a substantially non-reflective surface effective for absorbing heat energy from the sun and transferring the heat to air in the interior of the column. A condenser is secured within the column, and includes a condensing surface with a thermoelectric or natural gas cooler positioned thereon for cooling the condensing surface. A collector is positioned within the column for collecting water that condenses on and falls from the at least one condensing surface of the condenser, and an accumulator is coupled in fluid communication with the collector for accumulating the water.

32 Claims, 6 Drawing Sheets

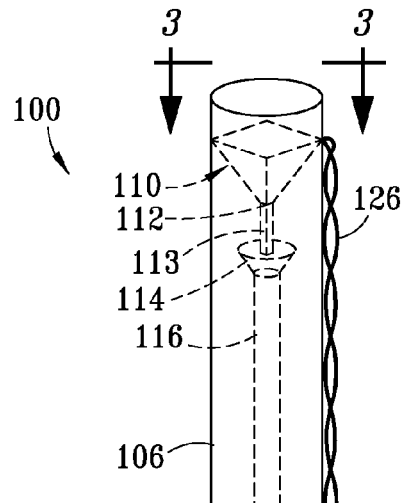
FIG. 1
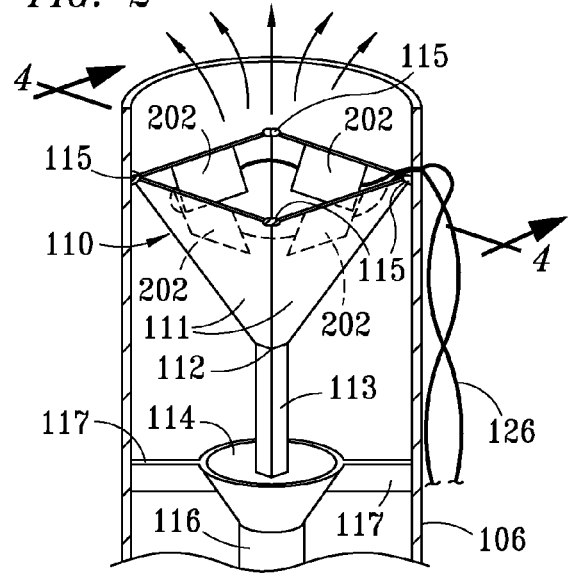
FIG. 2
FIG. 3

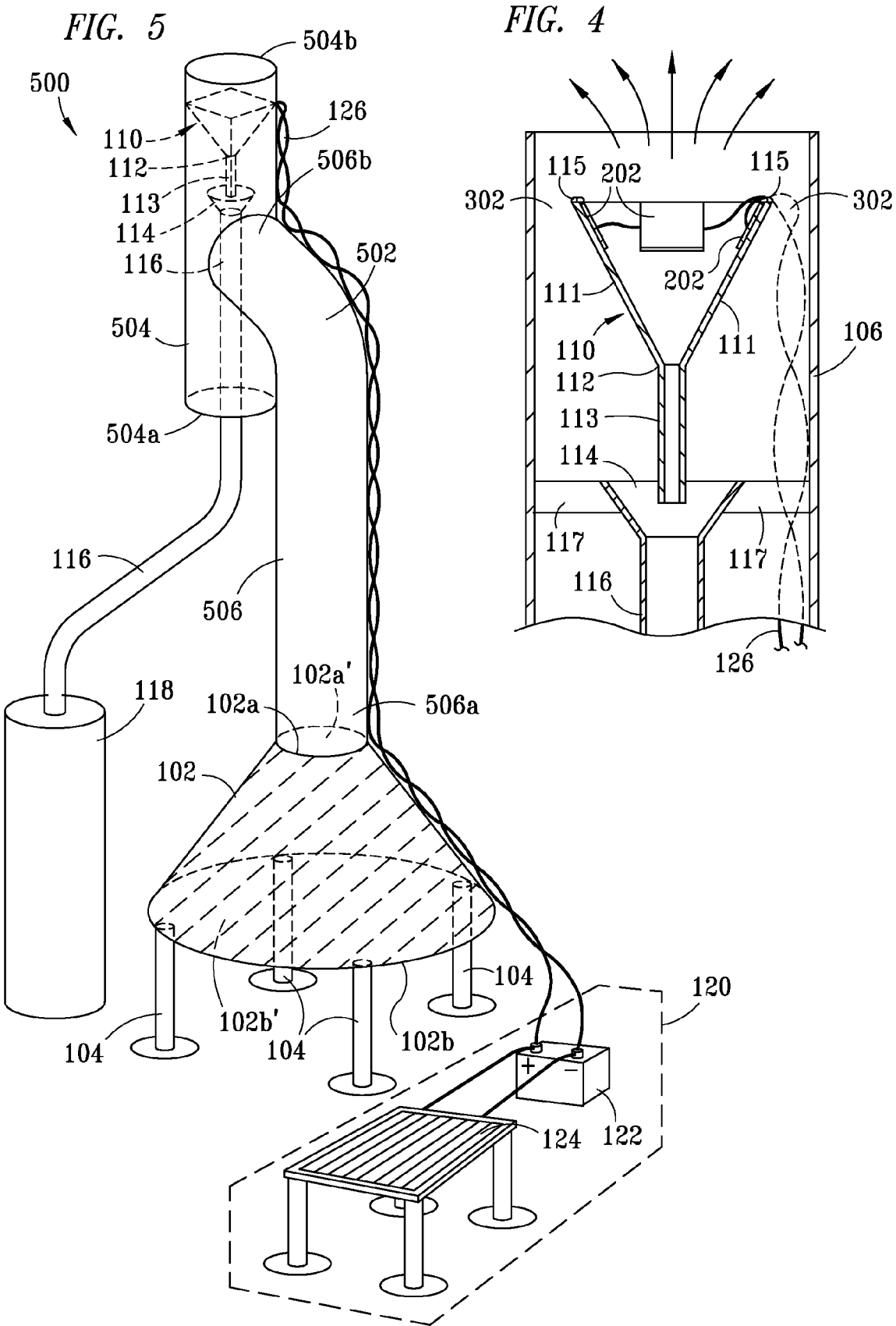

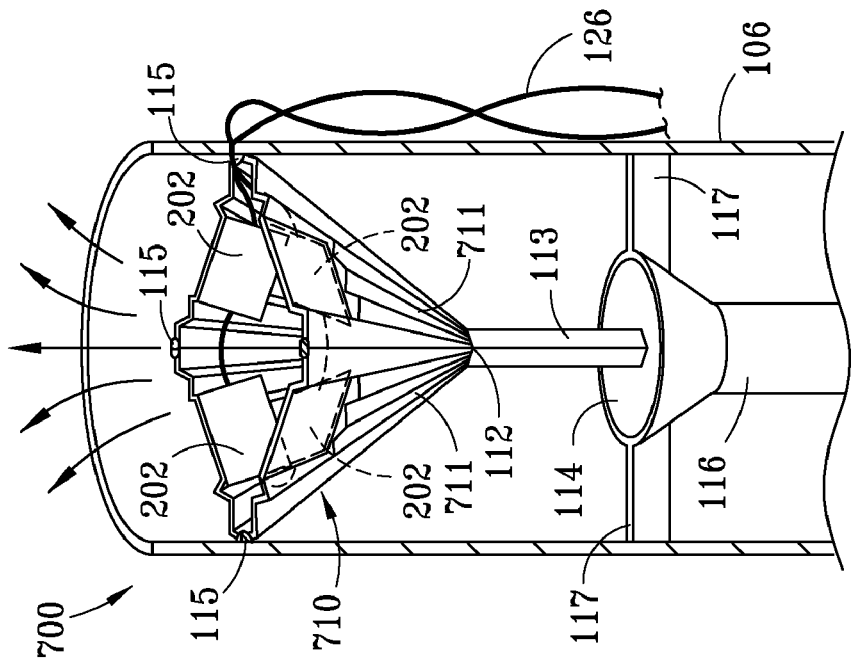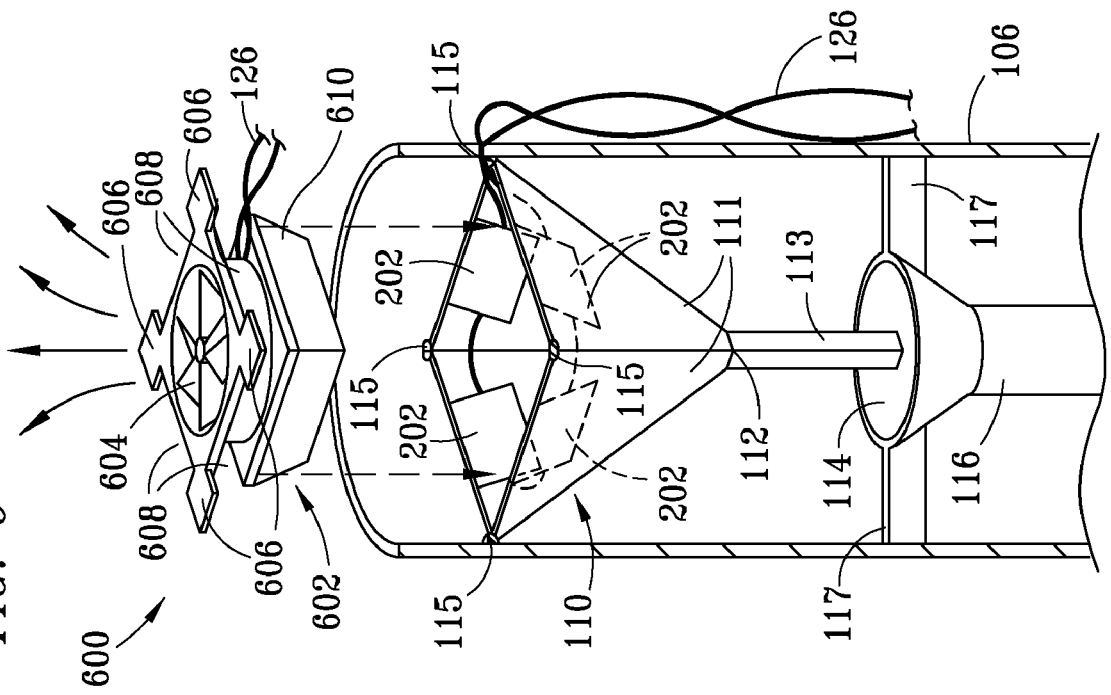

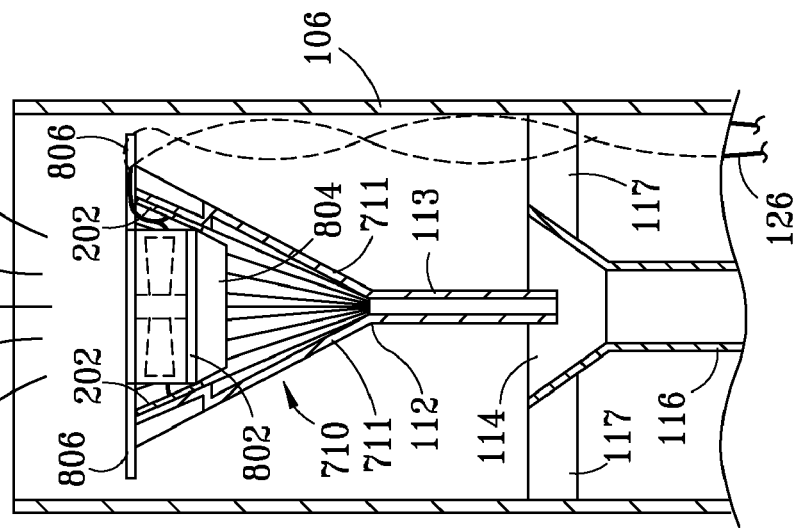
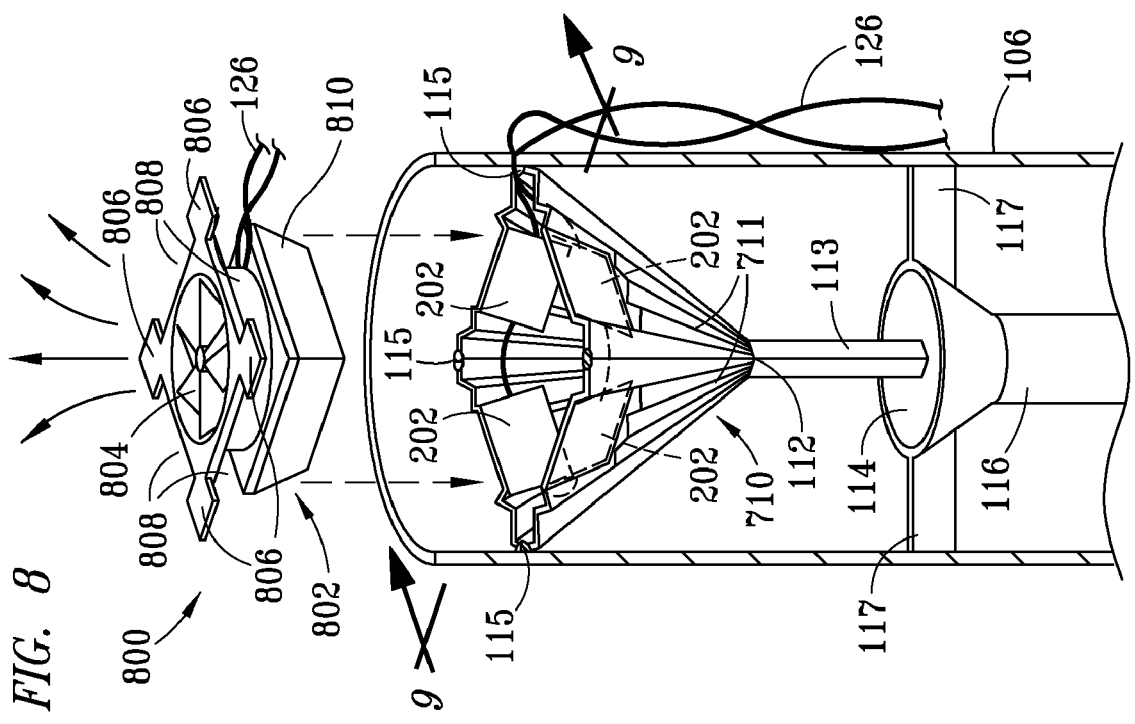

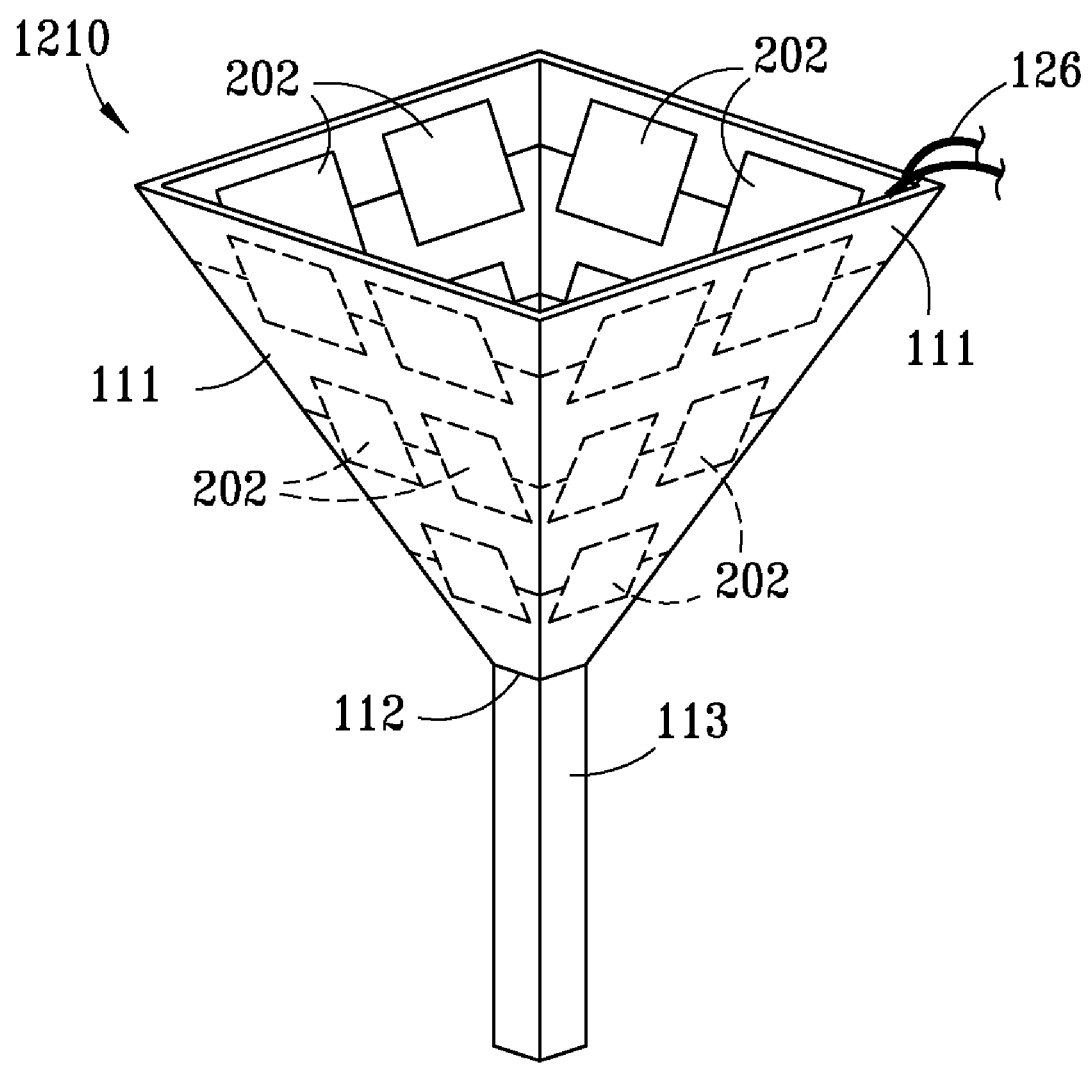

US 7,887,622 B1

SYSTEM, AND ASSOCIATED METHOD, FOR RECOVERING WATER FROM AIR

CROSS-REFERENCE TO RELATED APPLICATIONS

This application is a continuation-in-part of U.S. Pat. No. 7,478,535, to be issued on Jan. 20, 2009, formerly patent application Ser. No. 11/148,483, filed on Jun. 9, 2005.

TECHNICAL FIELD

The invention relates generally to recovering water from air, and, more particularly, to condensing and collecting water that has been absorbed into humid air, also known as the atmosphere.

BACKGROUND

The supply of water, and clean water in particular, has progressively become a serious problem in many parts of the world. The ground water level sinks, severe droughts occur, landscapes dry up, and deserts spread. The water which exists in these areas is generally very highly polluted, which in turn can lead to disease among both people and animals, with infections, which can result in major disasters.

Many attempts have been made to supply such problem areas with water in some form or other, either by drilling to great depths in the soil to create water wells and recover water from under the ground, or by damming up and channeling as needed water on the surface of the ground. However, there are regions in which water may not be recovered from under the ground via wells, and no water is available on the surface of the ground that may be dammed and channeled, and such techniques are therefore not available.

Where sea water is available, plants have been developed for purifying such water in order to provide drinking water. However, sea water is not always available, or is only available via extensive pipeline systems, and such plants are generally prohibitively expansive to build, and require substantial energy to operate.

Where water is not available either under the ground or on the surface of the ground, and sea water is not readily available, attempts have been made to recover moisture from the atmosphere, that is, by recovering water which exists in humid air. Techniques which have heretofore been developed for recovering water from air require complex equipment, such as evaporators, condensers, large fans to force air through a system, and/or the like, and substantial space for such equipment, as well as substantial energy to operate such equipment.

Accordingly, a continuing search has been directed to the development of systems and methods which can recover water from the atmosphere, which systems and methods do not require complex equipment and substantial amounts of space and energy to operate.

SUMMARY

The present invention, accordingly, provides an apparatus for recovering water from air. The apparatus includes a funnel having a non-reflective surface oriented for receiving and absorbing heat energy from the sun, and an upwardly-oriented vertex end defining a vertex opening, and a downwardly-oriented base end defining a base opening larger than the vertex opening. The funnel is preferably supported on legs positioned proximate to the base opening of the lower funnel. An upwardly extending column having a relatively non-reflecting exterior surface is attached to the vertex opening for facilitating fluid communication by convection from the funnel to the column. A condensing surface is secured within the interior of the column, and at least one thermoelectric cooler or continuous absorption cooler operable by the application heat furnished by gas is positioned on the condensing surface for cooling the condensing surface. A collector is positioned within the column for catching water that condenses on, and drips from, the condensing surface. The collector is connected in fluid communication with an accumulator for receiving and accumulating condensate received by the collector.

In the operation of the invention, the funnel is heated from sun light, and heat is transferred from the funnel to air inside the funnel, causing the air to rise into, and flow through, the column. Water in the air condenses on the condensing surface, drips from the condensing surface, is caught by the collector, and accumulated in the accumulator for access by a user.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 exemplifies a perspective view of a water recovery system embodying features of the present invention;

FIG. 2 exemplifies a perspective view of an interior of a condenser adapted for use in the system of FIG. 1;

FIG. 3 presents a plan view of the condenser of FIG. 2 taken along the line 3-3 of FIG. 1;

FIG. 4 presents an elevation view of the condenser of FIG. 2 taken along the line 4-4 of FIG. 2;

FIG. 5 exemplifies an alternate embodiment of the water recovery system of FIG. 1 embodying features of the present invention;

FIG. 6 exemplifies an alternate embodiment of the condenser of FIG. 2, wherein a fan is provided to move air and dissipate heat;

FIG. 7 exemplifies a further alternate embodiment of the condenser of FIG. 2, wherein the walls of the funnel are pleated to facilitate drainage of water;

FIG. 8 exemplifies a further alternate embodiment of the condenser of FIG. 7, wherein a fan is provided to move air and dissipate heat;

FIG. 9 presents an elevation cross-sectional view of the condenser of FIG. 8 taken along the line 9-9 of FIG. 8;

FIG. 12 exemplifies an alternative embodiment of a condenser embodying features of the present invention.

DETAILED DESCRIPTION

Figure 11:
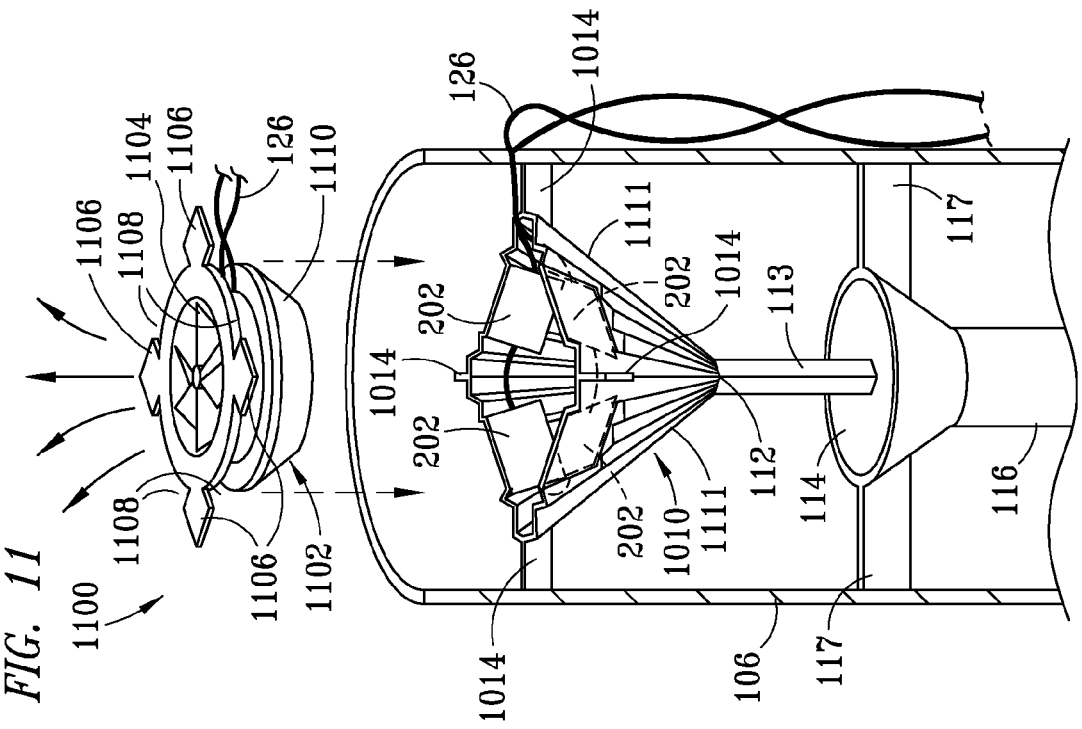
FIG. 11 exemplifies an alternate embodiment of the condenser of FIG. 10, wherein the walls of the funnel are pleated to facilitate drainage of water.

In the following discussion, numerous specific details are set forth to provide a thorough understanding of the present invention. However, it will be obvious to those skilled in the art that the present invention may be practiced without such specific details. Additionally, for the most part, details concerning thermoelectric coolers, continuous absorption coolers, solar panels, and the like, have been omitted inasmuch as such details are not considered necessary to obtain a complete understanding of the present invention, and are considered to be within the skills of persons of ordinary skill in the relevant art.

Refer now to the drawings wherein depicted elements are, for the sake of clarity, not necessarily shown to scale and wherein like or similar elements are designated by the same reference numeral through the several views.

In FIG. 1 of the drawings, the reference numeral 100 generally designates a water recovery system embodying features of the present invention. The system 100 includes a funnel 102, preferably supported in a conventional manner on four legs 104, though any number of legs may be utilized in support of the funnel, or legs may be omitted and openings formed in the funnel 102 to permit the inflow of air. The funnel 102 is preferably fabricated from sheet metal, and includes a vertex, or upper, end 102a defining a vertex, or upper, opening 102a', and a base, or lower, end 102b defining a base, or lower, opening 102b' larger than the vertex opening 102a'. The exterior surface of the funnel 102, and optionally, the interior surface as well, are substantially non-reflective surfaces, such as, for example, black surfaces, or other dark colored substantially non-reflective surfaces.

A column 106 is mounted over the upper opening 102a' to facilitate fluid communication between the funnel 102 and the column 106. The column 106 is preferably fabricated from sheet metal, having a cross-section which is preferably circular, and includes an exterior surface, and optionally, an interior surface as well, which is substantially reflective, being, for example, metallic, white, or other substantially light reflective color. Alternatively, depending on air temperature and humidity and exposure to sunlight, it may be advantageous for facilitating convection for all or a portion of the exterior surface, and optionally, interior surface as well, of the column 106 to be substantially non-reflective, being, for example, black, or other substantially dark color, or some grade of reflectivity that is partially reflective and non-reflective. While the cross-section of the column 106 is exemplified as being circular, it may alternatively be any of a number of different shapes, such as square, triangular, or the like.

A condenser 110 is positioned within an upper portion of the column 106, and, as shown more clearly in FIGS. 2-3, preferably comprises four substantially flat triangular sides, or walls, 111 configured to form a funnel in the shape of an inverted pyramid. A tube 113 extends downwardly from an opening formed at a vertex 112 of the condenser 110, and fluid communication is thereby established between the interior of the condenser 110 and the interior of the tube 113. The walls 111 and tube 113 are preferably fabricated from sheet metal, though any other suitable material effective for conducting heat may be utilized. The condenser 110 is preferably secured in the column 106 by tack welding each of four corners 115 of the condenser 110 to the interior wall of the column 106. Alternatively, the condenser 110 may be secured in the column 106 using any other conventional means, such as support arms or braces extending between the condenser 110 and the column 106, similar to the support arms or braces 117 extending between the collector 114 and the column 106, described below with respect to FIG. 2. The condenser 110 is described in further detail below.

A collector 114 is preferably positioned within the column 106 under the vertex 112 and tube 113 of the condenser 110 for receiving water that drips from the vertex 112 and tube 113. The collector 114 is preferably conically-shaped, and is supported therein using any conventional means, such as a plurality of metal arms or braces 117 extending between the collector 114 and the column 106, or (not shown) between the collector 114 and the tube 113.

A conduit 116, such as a tube or hose, is preferably connected in fluid communication between the collector 114 and an accumulator 118, such as a drum, and extends through the wall of the column 106, for facilitating the flow of water from the collector 114 to the accumulator 118. The accumulator 118 is configured for accumulating and storing water captured by the collector 114, and, but for the conduit 116, is preferably closed and sealed at the top, though it may alternatively be open-topped. While not shown, the accumulator 118 preferably also includes means, such as a valve positioned in a lower portion of the accumulator 118, for enabling a user to conveniently draw water from the accumulator in a manner well known in the art. The accumulator 118 is preferably positioned laterally and externally of the funnel 102, but may alternatively be centrally positioned directly under the funnel 102 and condenser 110, and the conduit 116 run straight downwardly from the collector 114 to the accumulator 118.

The system 100 also includes an electrical power source 120, preferably comprising one or more batteries 122 and solar panels 124, which are preferably configured in a conventional manner for working together so that power may be supplied from the battery when there is little or no sunshine to energize the solar panels. The electrical power source 120 is connected via wires 126 for supplying electrical power to the certain components of the condenser 110, described further below. The electrical power source 120 is preferably self-contained, needing no external power supply, though external electrical power may optionally be made available through conventional power sources, as needed, should the electrical power source 120 be unable to supply the quantity of power needed by the condenser 110.

FIG. 2 depicts details of one preferred embodiment of the condenser 110. As shown therein, the condenser 110 is configured as a funnel, preferably having the shape of an inverted pyramid preferably with four walls 111 fabricated from sheet metal, or the like, effective for conducting heat. Alternatively, the condenser 110 may be configured in any of a number of different ways, and may, by way of example, have more or less than four walls, or assume alternative configurations as discussed below.

At least one continuous absorption type of cooling unit operated by the application of a limited amount of heat furnished by gas, Peltier Junction Module, or thermoelectric cooler (TEC), 202 is preferably positioned on an interior surface of each wall 111 so that, when energized, the TEC's absorb heat from, and thereby cool, the walls 111 of the condenser 110. The TEC's 202 are electrically coupled via the wires 126 to the power supply 120, and may be interconnected in any conventional manner, such as by a parallel or serial circuit. TEC's, such as described herein, are considered to be well-known in the art and, therefore, will not be described in further detail herein, except insofar as necessary to describe the invention.

FIG. 3 depicts a plan view of the condenser 110 within the column 106. As exemplified most clearly therein, the TEC's 202 are preferably serially connected to the wires 126, though they may alternatively be connected in parallel. Also shown in FIG. 3 are spaces 302 between the column 106 and the condenser 110, to thereby facilitate the upward flow of air through the column 106 and pass the condenser 110, for reasons discussed in further detail below.

FIG. 4 exemplifies a cross-sectional elevation view of the condenser 110 in its relation to the collector 114 within the column 106.

In operation, the system 100 is preferably positioned so that the funnel 102 is exposed to sunlight which is absorbed by, and thereby heats, the dark or black surface of the funnel 102. Heat from the surface 102 heats humid air inside the funnel 102, causing the air to convectively rise up in the funnel 102 through the vertex opening 102a', into the column 106, pass the walls 111 of the condenser 110, and through the spaces 302. Electrical power is applied to the TEC's 202 to cause them thereby to cool the walls 111 of the condenser 110. As heated humid air passes over the cooled condenser 110, water in the air condenses onto outer surfaces of the condenser 110. Water condensed onto the outer surface of the condenser 110 then flows, from the force of gravity, downwardly towards the vertex 112 and along the tube 113, and then drips into the collector 114. Water caught by the collector 114 then flows through the conduit 116 to the accumulator 118, where it is made available for use by a user (not shown) in a conventional manner.

FIG. 5 depicts the details of a water recovery system 500 according to an alternate embodiment of the present invention. Since the water recovery system 500 contains many components that are substantially identical to those of the previous embodiment, such components are referred to by the same reference numerals and will not be described in any further detail. According to the embodiment of FIG. 5, the column 106 is replaced by a primary column 506 having a bend 502 formed between a lower portion 506a and an upper portion 506b of the column 506. The lower portion 506a of the column 506 is connected in fluid communication to the funnel 102, and the upper portion 506b of the column 506 is connected in fluid communication to a central portion of an auxiliary column 504. The auxiliary column 504 is preferably a substantially straight, vertically extending column which defines an open lower end 504a and an open upper end 504b. The condenser 110 and collector 114 are positioned within the auxiliary column 504 between the open upper end 504b of the auxiliary column 504 and the connection of the upper portion 506b of the column 506 to the auxiliary column 504, and are secured thereto similarly as described above with respect to FIGS. 1-4. In further contrast to the water recovery system 100, wherein the conduit 116 extends through the wall of the column 106, in the water recovery system 500, the conduit 116 preferably runs downwardly through the open lower end 504a of the auxiliary column 504.

Operation of the water recovery system 500 is similar to the operation of water recovery system 100, the only material difference being that warm humid air passes from the primary column 506 to the auxiliary column 504 before passing over the condenser 110.

FIG. 6 depicts the details of a water recovery system 600 according to an alternate embodiment of the present invention. The system 600 is similar to the embodiments 100 and 500 described above with respect to FIGS. 1-5, but for the addition of a fan assembly 602 positioned in an upper portion of the condenser 110. The fan assembly 602 includes a conventional fan 604 mounted to a plate 606 which is configured for resting on the condenser 110, to thereby support the fan assembly 602. The fan assembly 602 is electrically coupled via the wires 126 to the power source 120 for receiving electrical power operative for running the fan 604. The plate 606 preferably includes cut-outs 608 configured for facilitating and directing the flow of air over the hot side of the TEC's 202, to thereby cool the TEC's. The fan assembly 602 preferably further includes a short slotted duct, or shroud, 610 extending downwardly and inwardly (as viewed in FIG. 6) from the fan assembly 602 for exhausting air from the heated side of the TEC's 202 and, further, for facilitating and directing the flow of air through the column 106 over the TEC's 202.

Operation of the water recover system 600 is substantially similar to the operation of the invention as described above with respect to FIGS. 1-5, but for operation of the fan assembly 602, which facilitates further dissipation of heat from the TEC's 202, to thereby further cool the surfaces 111 of the condenser 110, to thereby facilitate more efficient operation of the water recovery system 100 or 500.

FIG. 7 depicts the details of a water recovery system 700 according to an alternate embodiment of the present invention. The system 700 is similar to the embodiments 100 and 500 described above with respect to FIGS. 1-5, but for the utilization of a condenser 710 having walls 711 corresponding to, but different from, the walls 111. In contrast to the walls 111, the walls 711 are pleated to facilitate the flow of condensed water from the walls 111 to the tube 113 and collector 114. While the walls 711 are depicted as pleated, the walls 711, or the respective surfaces thereof, may be configured in any suitable manner effective for facilitating the flow of condensed water from the walls 111, such as a herringbone design, or the like. Operation of the water recovery system 700 is similar to the operation of water recovery systems 100 and 500 as described above with respect to FIGS. 1-5.

FIGS. 8 and 9 depict the details of a water recovery system 800 according to an alternate embodiment of the present invention. The system 800 is similar to the embodiment 700 described above with respect to FIG. 7, but for the addition of a fan assembly 802 positioned in an upper portion of the condenser 710. The fan assembly 802 is similar to the fan assembly 602 and, accordingly, includes a conventional fan 804 mounted to a plate 806 which is configured for resting on the condenser 710, to thereby support the fan assembly 802. The fan assembly 802 is electrically coupled via the wires 126 to the power source 120 for receiving electrical power operative for running the fan 804. The plate 806 preferably includes cut-outs 808 configured for facilitating and directing the flow of air over the hot side of the TEC's 202, to thereby cool the TEC's. The fan assembly 802 preferably further includes a duct 810 extending downwardly and inwardly from the fan assembly 802 for further directing the flow of air over the TEC's 202. Operation of the water recover system 700 as depicted in FIG. 8 is substantially similar to the operation of the invention as described above with respect to FIG. 6.

Figure 10:
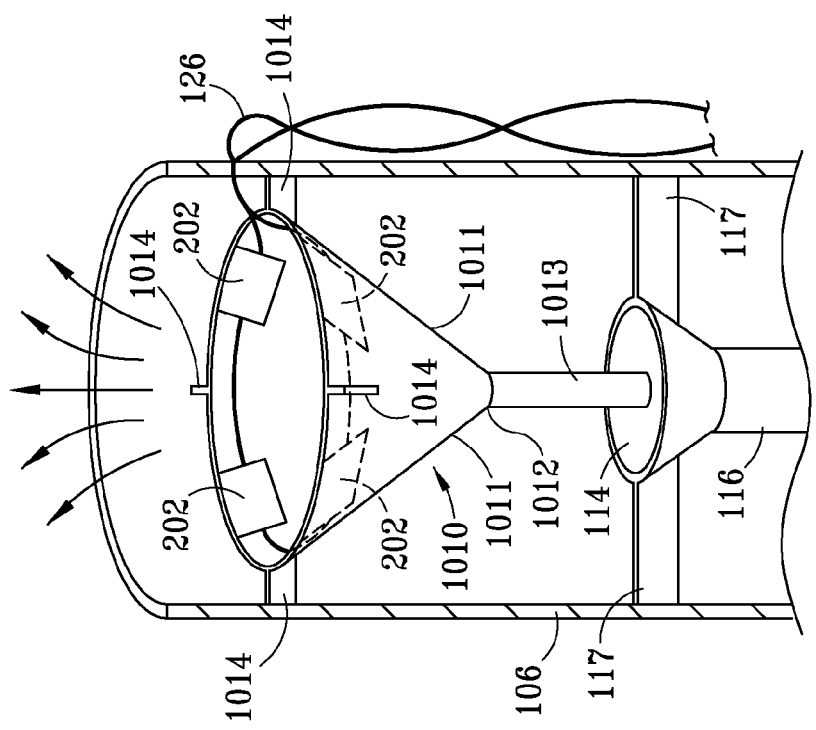
FIG. 10 exemplifies a further alternate embodiment of the condenser of FIG. 2, wherein the funnel is conical.

FIG. 10 depicts the details of a water recovery system 1000 according to an alternate embodiment of the present invention. The system 1000 is similar to the embodiments 100 and 500 described above with respect to FIGS. 1-5, but for the utilization of a condenser 1010 having a conical-shaped wall 1011 corresponding to the walls 111. Operation of the water recovery system 700 is similar to the operation of water recovery systems 100 and 500 as described above with respect to FIGS. 1-5.

FIG. 11 depicts the details of a water recovery system 1100 according to an alternate embodiment of the present invention. The system 1100 is similar to the embodiment 1000 described above with respect to FIG. 10, but for the utilization of a condenser 1010 having walls 1111 corresponding to, but different from, the walls 1011, and but for the addition of a fan assembly 1102 positioned in an upper portion of the condenser 1010. In contrast to the walls 1011, the walls 1111 are pleated to facilitate the flow of condensed water from the walls 1111 to the tube 113 and collector 114. While the walls 1111 are depicted as pleated, the walls 1111, or the respective surfaces thereof, may be configured in any suitable manner effective for facilitating the flow of condensed water from the walls 1111, such as a herringbone design, or the like.

The fan assembly 1102 is similar to the fan assemblies 602 and 802 and, accordingly, includes a conventional fan 1104 mounted to a plate 1106 which is configured for resting on the condenser 1010, to thereby support the fan assembly 1102. The fan assembly 1102 is electrically coupled via the wires 126 to the power source 120 for receiving electrical power operative for running the fan 1104. The plate 1106 preferably includes cut-outs 1108 configured for facilitating and directing the flow of air over the hot side of the TEC's 202, to thereby cool the TEC's. The fan assembly 1102 preferably further includes a duct 1110 extending downwardly and inwardly from the fan assembly 1102 for further facilitating and directing the flow of air over the TEC's 202.

Operation of the water recover system 1100 as depicted in FIG. 11 is substantially similar to the operation of the invention as described above with respect to FIGS. 6, 8, and 9.

By the use of the present invention, a system and method are disclosed which can recover water from the atmosphere, and which do not require complex equipment and substantial amounts of space and energy to operate.

It is understood that the present invention may take many forms and embodiments. Accordingly, several variations may be made in the foregoing without departing from the spirit or the scope of the invention. For example, the column 106 or 506 could operate without the funnel 102, or the column 106 or 506 could in its entirety constitute a funnel without a cylindrical portion. The system 100 may be fabricated without the legs 104, and holes may be perforated in the funnel 102 to allow for the entry of air therein. Still further, the condenser 110, 710, or 1010 may be modified, as exemplified in FIG. 12 by a condenser 1210, wherein larger and/or additional TEC's 202 are positioned on the interior of the walls 111 and arranged thereon (e.g., side-by-side or stacked) and/or shaped to thereby maximize the portion of the surface of the walls 111 that is cooled by the TEC's.

In a still further variation of the foregoing, as an alternative to cooling provided by the TEC's 202, the walls 111, 711, 1011, and/or 1111 of a respective condenser may be cooled using other cooling and refrigeration technologies, such as natural gas technologies, including (1) a continuous absorption type of cooling unit operated by the application of a limited amount of heat furnished by natural gas (e.g., as developed by Servel, Inc.) (or alternatively, heated by electricity, kerosene, and/or any other suitable fuel), (2) engine driven chillers, (3) desiccant dehumidification systems, and/or the like. It is considered that such alternative cooling technologies are well-known in the art, and that a person skilled in the art, upon a reading of the invention disclosed herein, could implement such technologies and, therefore, will not be discussed in further detail herein.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A system for condensing water from air, the system comprising:

a column, at least a portion of which comprises a substantially non-reflective surface effective for absorbing heat energy from the sun and transferring said heat to air in the interior of said column, said column further defining an open first end and an open second end;

a condenser secured within said column, said condenser having at least one condensing surface;

at least one natural gas cooler positioned on said at least one condensing surface of said condenser for cooling said at least one condensing surface;

an electrical power source coupled for providing electrical power to said to said at least one natural gas cooler;

a collector positioned within said column for collecting water that condenses on and falls from said at least one condensing surface of said condenser; and an accumulator coupled in fluid communication with said collector for accumulating said water.

2. The system of claim 1, further comprising legs positioned at said first end for supporting said column in an elevated position.

3. The system of claim 1, wherein said first end is a lower end, said second end is an upper end, and said lower end includes a portion configured as a funnel having a substantially non-reflective surface effective for absorbing heat energy from the sun and transferring said heat energy to air inside said funnel.

4. The system of claim 1, wherein said first end is a lower end, said second end is an upper end, and said lower end includes a portion configured as a funnel having a substantially non-reflective surface effective for absorbing heat energy from the sun and transferring said heat energy to air inside said funnel; and said system further comprises legs secured to said funnel portion for supporting said funnel portion and column in an elevated position.

5. The system of claim 1, wherein said column is an auxiliary column, and said system further comprises a primary column coupled in fluid communication to said auxiliary column.

6. The system of claim 1, wherein said column is an auxiliary column, and said system further comprises a primary column coupled in fluid communication to said auxiliary column; and wherein said primary column defines an open lower end and an open upper end, and said lower end includes a portion configured as a funnel having a substantially non-reflective surface effective for absorbing heat energy from the sun and transferring said heat energy to air inside said funnel.

7. The system of claim 1, wherein said non-reflective surface is a substantially black surface.

8. The system of claim 1, wherein said at least one condensing surface includes at least three substantially triangular condensing surfaces configured substantially to form a pyramid having a vertex, and said collector is positioned under said vertex for receiving water that condenses on and falls from said at least three substantially triangular condensing surfaces.

9. The system of claim 1, wherein said at least one surface includes at least three substantially triangular surfaces configured substantially to form a pyramid having a vertex, and said collector is positioned under said vertex for receiving water that condenses on and falls from said at least three substantially triangular surfaces; and said at least three substantially triangular surfaces define ridges formed thereon for increasing the surface area of said at least three surfaces and for facilitating movement of water toward said vertex.

10. The system of claim 1, wherein said natural gas coolers are continuous absorption coolers.

11. The system of claim 1, further comprising a fan electrically coupled to said power source for receiving operating power, and said fan being positioned for moving air to thereby dissipate heat from said natural gas coolers.

12. The system of claim 1, wherein said power supply includes at least one solar panel configured for converting solar energy to electrical energy effective for operating said natural gas coolers.

13. The system of claim 1, wherein said power supply includes at least one battery effective for supplying electrical energy to said natural gas coolers.

14. The system of claim 1, wherein said power supply includes at least one battery and at least one solar panel coupled with said at least one batter, said solar panel being configured for converting solar energy to electrical energy effective for operating said natural gas coolers.

15. The system of claim 1, wherein said at least one condensing surface is a conical surface.

16. The system of claim 1, wherein said condensing surface is positioned in an upper portion of said column.

17. A method for condensing water from air, the method comprising steps of:
  positioning a column having a substantially non-reflective surface to receive sunlight effective for heating said non-reflective surface and thereby to heat air within the interior of said column;
  securing a condenser within said column, said condenser having at least one condensing surface;
  positioning at least one natural gas cooler on said at least one condensing surface of said condenser for cooling said at least one condensing surface;
  coupling an electrical power source to said to said at least one natural gas cooler for providing electrical power thereto;
  positioning a collector within said column for collecting water that condenses on and falls from said at least one condensing surface of said condenser; and
  coupling an accumulator in fluid communication with said collector for accumulating said water.

18. The method of claim 17, further comprising the step of positioning legs at said first end for supporting said column in an elevated position.

19. The method of claim 17, wherein said first end is a lower end, said second end is an upper end, and said lower end includes a portion configured as a funnel having a substantially non-reflective surface effective for absorbing heat energy from the sun and transferring said heat energy to air inside said funnel.

20. The method of claim 17, wherein said first end is a lower end, said second end is an upper end, and said lower end includes a portion configured as a funnel having a substantially non-reflective surface effective for absorbing heat energy from the sun and transferring said heat energy to air inside said funnel; and said method further comprises the step of securing legs to said funnel portion for supporting said funnel portion and column in an elevated position.

21. The method of claim 17, wherein said column is an auxiliary column, and said method further comprises the step of coupling a primary column in fluid communication to said auxiliary column.

22. The method of claim 17, wherein said column is an auxiliary column, and said system further comprises a primary column coupled in fluid communication to said auxiliary column; and wherein said primary column defines an open lower end and an open upper end, and said lower end includes a portion configured as a funnel having a substantially non-reflective surface effective for absorbing heat energy from the sun and transferring said heat energy to air inside said funnel.

23. The method of claim 17, wherein said non-reflective surface is a substantially black surface.

24. The method of claim 17, wherein said at least one condensing surface includes at least three substantially triangular condensing surfaces configured substantially to form a pyramid having a vertex, and said collector is positioned under said vertex for receiving water that condenses on and falls from said at least three substantially triangular condensing surfaces.

25. The method of claim 17, wherein said at least one surface includes at least three substantially triangular surfaces configured substantially to form a pyramid having a vertex, and said method further comprises the step of positioning said collector under said vertex for receiving water that condenses on and falls from said at least three substantially triangular surfaces; and said at least three substantially triangular surfaces define ridges formed thereon for increasing the surface area of said at least three surfaces and for facilitating movement of water toward said vertex.

26. The method of claim 17, wherein said natural gas coolers utilize continuous absorption cooling technology.

27. The method of claim 17, further comprising the steps of electrically coupling a fan to said power source for receiving operating power, and positioning said fan for moving air to thereby dissipate heat from said natural gas coolers.

28. The method of claim 17, wherein said power supply includes at least one solar panel configured for converting solar energy to electrical energy effective for operating said natural gas coolers.

29. The method of claim 17, wherein said power supply includes at least one battery effective for supplying electrical energy to said natural gas coolers.

30. The method of claim 17, wherein said power supply includes at least one battery and at least one solar panel coupled with said at least one batter, said solar panel being configured for converting solar energy to electrical energy effective for operating said natural gas coolers.

31. The method of claim 17, wherein said at least one condensing surface is a conical surface.

32. The method of claim 17, wherein the step of positioning said at least one natural gas cooler further comprises positioning said condensing surface in an upper portion of said column.

* * * * *